Patented Oct. 5, 1937

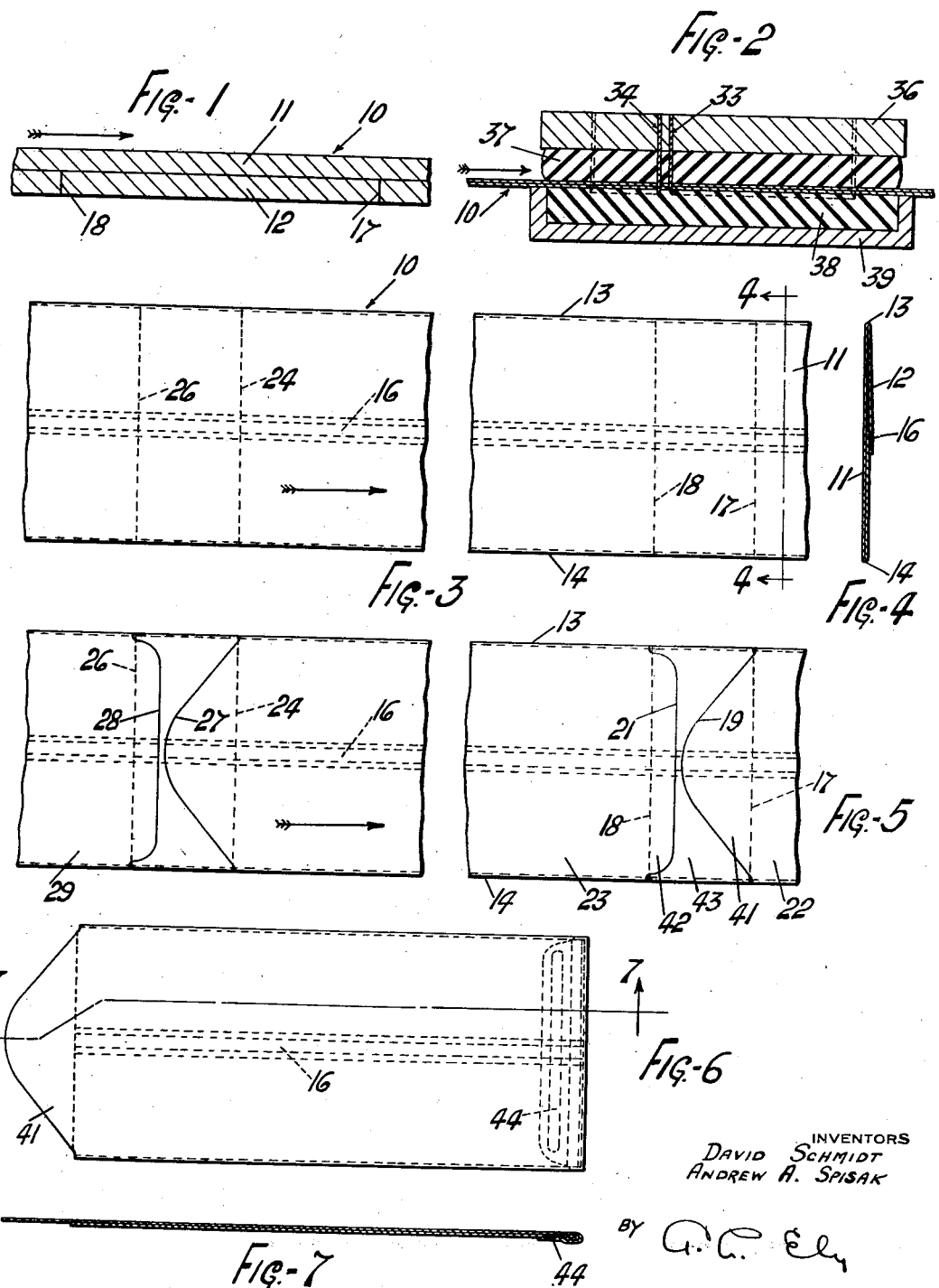

2,095,040

UNITED STATES PATENT OFFICE 2,095,040

PROCESS OF MAKING DIE-CUT BAGS

David Schmidt and Andrew A. Spisak, Cleveland, Ohio, assignors to The Dobeckmun Company, Cleveland, Ohio, a corporation of Ohio Application August 3, 1935, Serial No. 34,581

5 Claims. (Cl. 93—35)

This invention relates to the art of making die-cut bags directly from the web. However, it has never been possible as a commercially practical and successful operation to make a die-cut bag from a web. This process is particularly adapted for making die-cut bags from regenerated cellulose sheeting. Bags of various types have been made on machines in which a web of stock is formed over a mandrel or former into a substantially flat tube. As this tube of stock advances through the machine, a bottom is formed on one end of each length or section which is cut from the tube to form a bag. The cutting operations are performed by passing a cutting edge well through the stock, and where only one side of the tube is to be cut, the other side of the tube is protected from the cutting edge by a mandrel disposed within the tube. The cutting edge therefore cuts one side of the tube against the mandrel. As the mandrel has some thickness, it is not possible, as a practical manufacturing operation, to make a die-cut across the tube from one longitudinal edge thereof to the other because the cutting edge does not cut the material, at the edge of the tube, which is disposed about the longitudinal edges of the mandrel.

The purposes of this invention are to provide a method of making a die-cut bag from a web or tube of stock without using an internal mandrel and to provide a new form of die-cut bag. The new process permits a more rapid and economical production and reduces the waste which is encountered in the usual die-cut bag forming methods.

In accordance with the invention, a flattened tube is first made and then one side or ply only of the tube is cut through without the presence of an internal mandrel, leaving the other side or ply uncut. As the tube is flattened, the cut is made without leaving uncut portions at the edges of the tube.

The features of the invention are illustrated in the accompanying drawing, wherein:

Fig. 1 is a section taken longitudinally of the tube of stock which is cut through on one side or ply only;

Fig. 2 is a section taken longitudinally of the tube of stock and transversely of the curved knives or dies which form the curved cuts;

Fig. 3 is a top plan view of the tube of stock with portions thereof broken away, illustrating the straight cuts in the lower side or ply of the tube;

Fig. 4 is a section on the line 4—4 of Fig. 3;

Fig. 5 is a top plan view similar to Fig. 3, but showing the tube of stock after the curved cuts have been made to form the flaps on the upper side or ply of the tube;

Fig. 6 is a plan view of a completed bag; and

Fig. 7 is a section along the broken line 7—7 of Fig. 6.

The method of the invention may be practiced as shown in the drawing by supplying a web of stock, preferably regenerated cellulose sheeting, in the form of a substantially flat tube, indicated generally at 10, and comprising upper and lower sides 11 and 12 which are joined by longitudinally folded or creased edges 13 and 14. The lower side of the tube has a longitudinal seam 16 (Fig. 4). This tube of stock is advanced in the direction of the arrows or from left to right as viewed in Figs. 1, 2, 3 and 5. Preferably straight transverse cuts 17, 18 are formed in the lower side of the tube and then the curved cuts 19, 21, (Fig. 5) are formed in the upper side to complete the adjacent ends of adjacent bags 22 and 23. These operations are then repeated to form the straight cuts 24, 26 and the curved cuts 27, 28, which complete the adjacent ends of bags 23 and 29.

After making the preliminary cuts, the next operation is performed by the curved knives or dies 33 and 34 which are shown to an enlarged scale in Fig. 2. The knife 33 has its cutting edge shaped to form the curved cut 19 (Fig. 5) while the knife 34 is shaped to form the curved cut 21. These knives or dies are mounted on a metal block 36 in any approved manner. The cutting edges of these knives are spaced above the path of the stock as the latter is advancing to be cut. A pad 38 is mounted in a holder 39 directly beneath the knives and below the path of the stock.

As the stock arrives at the proper position beneath the knives 33 and 34, the cuts 19 and 21 are formed simultaneously by causing these knives or dies to descend to the position shown in Fig. 2 in which it will be noted that the cutting edges of these knives pass through and beyond both sides or plies of the tube and into the pad 38. Preferably this operation is performed while the stock is advancing by causing the knife block 36, the knives 33, 34, the pad 37, the pad 38, and the holder 39 to move in unison from left to right (Fig. 2) at the speed of the stock while these cuts are being made. After the curved cuts 19 and 21 have been made in this manner, it will be understood that the knife block 36 is raised so that the knives are out of the path of the stock.

It will be observed that the cut 19 forms the flap 41 on the upper side of bag 22 and also releases the material of the lower ply opposite this flap, since the knife 33 also cuts through the lower ply to the straight cut 17 at the longitudinal edges of the tube. Similarly the knife 34 cuts through the lower ply to the straight cut or slit 18 at the longitudinal edges of the tube and therefore releases a piece of the lower ply having the shape of the flap 42 which this knife forms on the upper side or ply. It will also be evident that the material between the knives 33 and 34, as indicated at 43, is cut away from both the upper and lower sides of the tube.

It will be seen that the procedure thus far described completes the cutting operations which form the adjacent ends of bags 22 and 23. The adjacent ends of bags 23 and 29 and of succeeding bags to be formed from this tube of stock are formed in identically the same manner. When the cutting operations have been completed on both ends of bag 23 for example, it is only necessary to fold over and secure the flap 42 as by means of adhesive 44, to complete the bag as shown in Figs. 6 and 7.

From the foregoing it will be seen that the invention provides for making a bag from a web of stock by die-cutting operations. While the method of cutting one side of the tube of stock has been illustrated only in forming the straight cuts 17, 18, 24 and 26, it will be understood that curved cuts, such as the cuts 19 and 21 for example, may be made by this method if this is desirable for any reason.

What is claimed is:

1. The method of making a bag which comprises supplying stock in the form of a substantially flat tube having its opposite walls disposed against each other, and cutting spaced slits through one wall of the tube only while flattened against the other wall thereof to define the free edges of adjacent bag blanks on the one wall of the tube.

2. The method of making a bag which comprises supplying stock in the form of a substantially flat tube, cutting pairs of spaced slits through one wall of the tube only while flattened against the other wall to define the free edges of adjacent bag blanks, and then severing the blanks from the tube by cutting through both plies between the spaced slits to define flaps on the ends of the blanks in the other wall of the tube.

3. The method of making a bag which comprises providing stock in the form of a substantially flat tube having creased longitudinal edges, cutting transversely across the tube through one wall thereof from one of the longitudinal edges to the other to form a free end edge of one wall of the bag, and cutting through both walls of the tube from one longitudinal edge to the other to form a flap on the other wall of the bag and to release the material opposite the flap on said one wall of the bag.

4. The method of successively forming bags from a substantially flat tube of stock having creased longitudinal edges, which comprises cutting through one wall of the tube from one longitudinal edge to the other at points spaced longitudinally of the tube to form adjacent end edges for one wall of each of adjacent bags, and forming flaps on the adjacent ends of the other walls of said adjacent bags by cutting through both walls of the tube from one longitudinal edge to the other, thereby releasing the material between the flaps on both walls of the tube and releasing the material on said one wall which is opposite said flaps.

5. The method of successively forming bags from a substantially flat tube of regenerated cellulose sheeting having creased longitudinal edges which comprises cutting one wall of the tube from one longitudinal edge to the other at points spaced longitudinally of the tube to form adjacent end edges for one wall of each of adjacent bags, and forming flaps on the adjacent ends of the other wall of said adjacent bags by cutting through both walls of the tube from one longitudinal edge to the other, thereby releasing the material between the flaps on both walls of the tube and also releasing the material opposite said flaps.

DAVID SCHMIDT.
ANDREW A. SPISAK.